United States Patent Office 3,033,056
Patented May 8, 1962

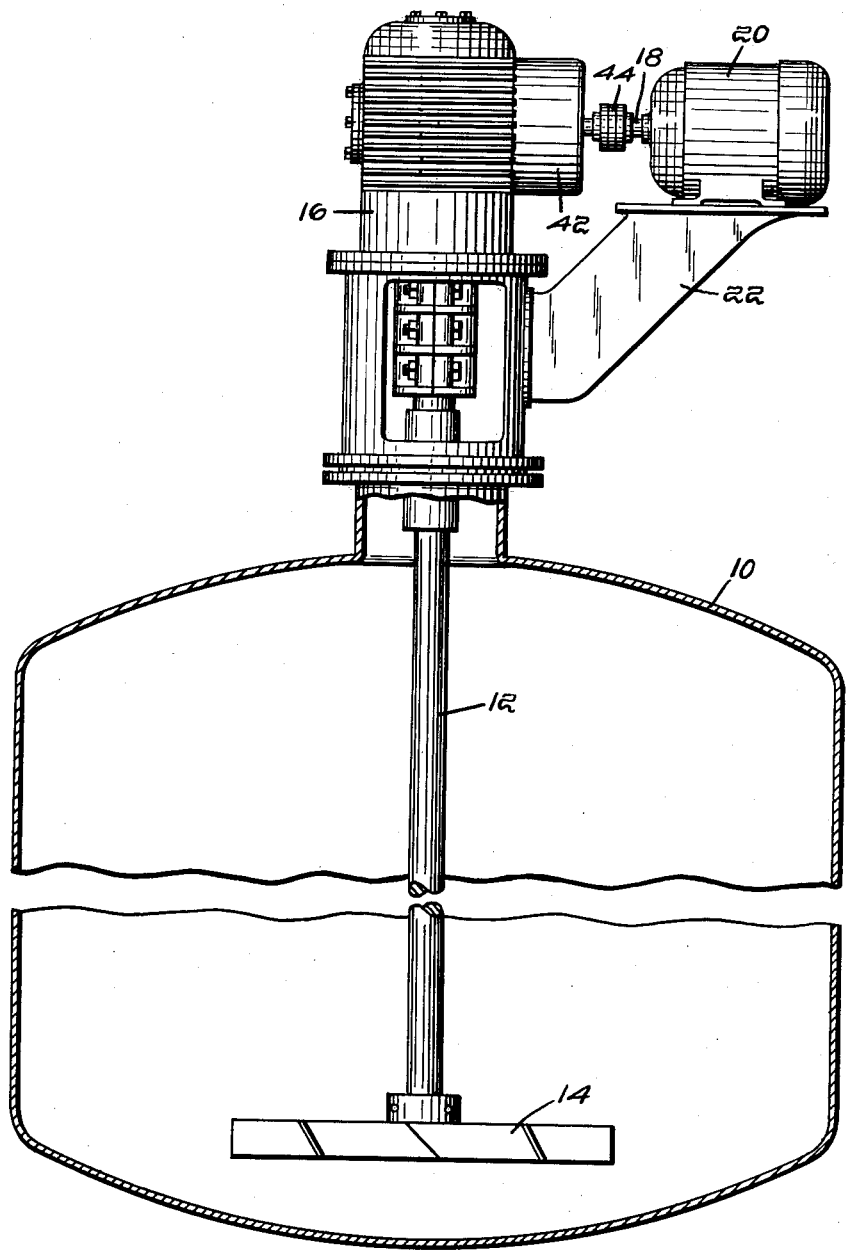

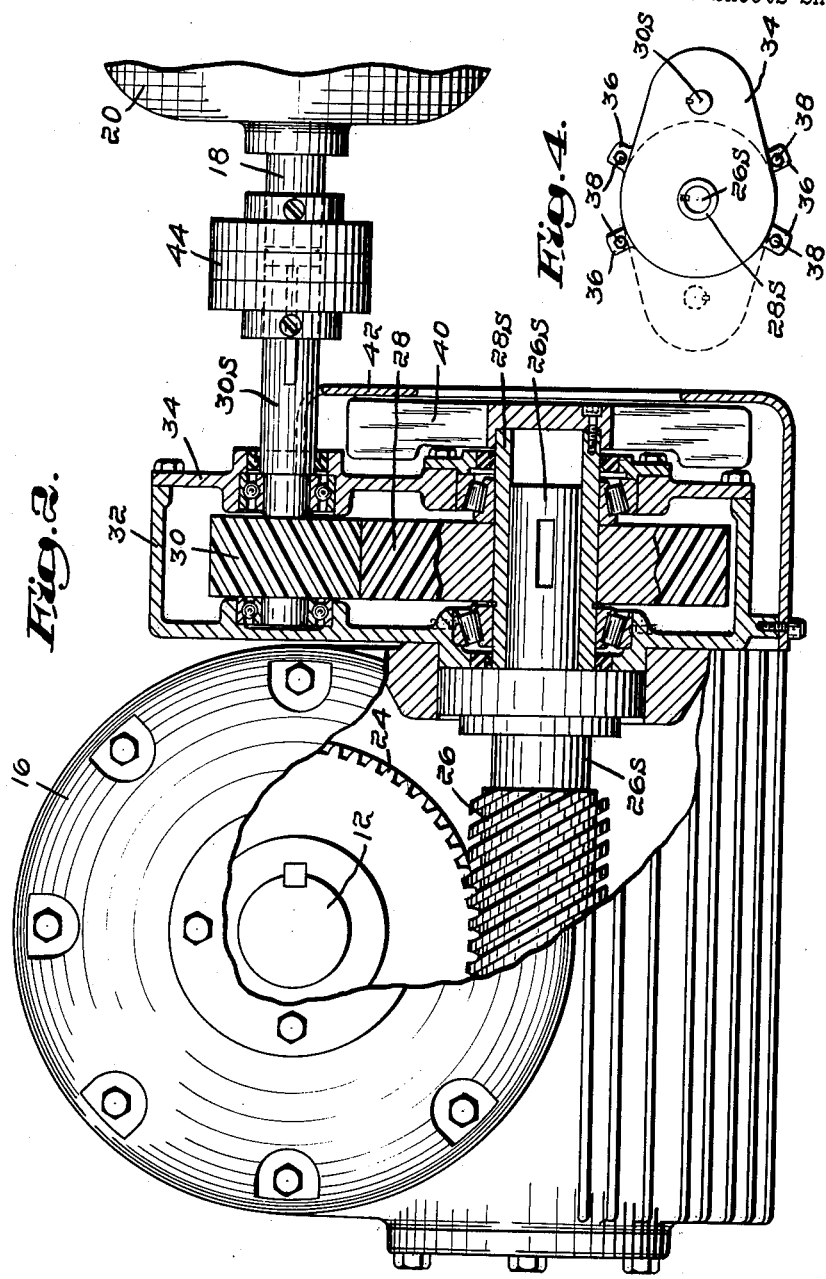

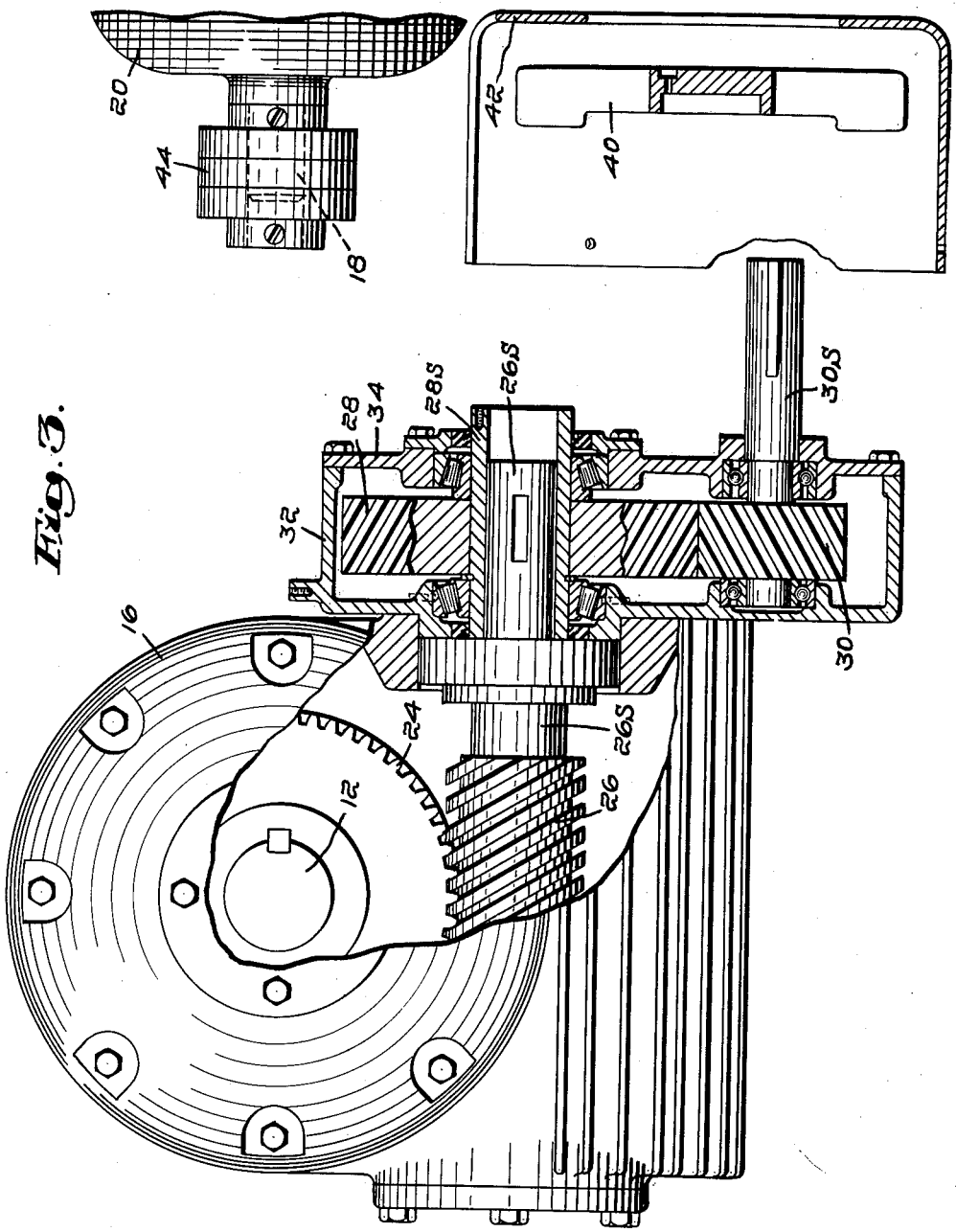

3,033,056
POWER TRANSMISSION MEANS AND
HOUSING THEREFOR
John J. Lennon, Winchester, Mass., assignor to Nettco Corporation, Everett, Mass., a corporation of Massachusetts
Filed Aug. 13, 1959, Ser. No. 833,436
5 Claims. (Cl. 74—606)

This invention relates to machines having a train of driving gears including a pair of coplanar gears, and the object is to provide an improved construction facilitating the care, replacement or change of such gears. In the case of change, a change in the speed ratio may be effected.

The invention finds a particular application to a machine for stirring liquids or semi-liquids, and I have shown in the accompanying drawings and shall describe such a machine by way of example.

In the drawings:

FIG. 1 is an elevation partly in section and partly broken away of a stirring or agitating machine;

FIG. 2 is a plan view partly in section showing the driving mechanism;

FIG. 3 is a similar view showing parts in another position and with certain parts removed to one side (toward the right viewing the figure); and FIG. 4 is a schematic view of a gear casing as viewed from the right of FIG. 2 illustrating it in two alternative positions.

For convenience in the description I may refer to various parts as being vertical or horizontal having reference to the machine shown but these words are not to be taken as a limitation but simply to facilitate reading the drawings.

In FIG. 1 of the drawings there is shown a mixer or agitating machine including a tank 10 in which depends a vertical shaft 12 (the final driven shaft of the train) carrying at its lower end the agitator 14 and having bearings in housing 16 at the top of the tank. This shaft is driven through intermediate gearing from a main drive shaft 18 illustrated as that of an electric motor 20 supported on a bracket 22.

Referring now to FIG. 2 the shaft 12 (in this instance a separate piece of shafting secured by a coupling to the shaft section which actually extends into the tank) carries a worm wheel 24 adapted to be driven by a worm 26 on a horizontal shaft 26S journalled in bearings in the housing 16 and having an end projecting beyond the same at the right in FIG. 2. This shaft is laterally displaced from shaft 18 being in the example shown in a different vertical plane and also axially offset, the right-hand end of shaft 26S not overlapping the left-hand end of motor shaft 18. There is a space between the vertical wall of the casing 16 and the end of shaft 18 which accommodates, in the working position of the parts, the gear box 32 which will be hereinafter described. The drive between the two shafts is affected by a pair of coplanar gears 28 and 30 such as ordinary spur gears, stepped gears or, as illustrated, helical gears. These are received in a gear box comprising a shallow tray-shaped gear box 32 having a removable cover 34. In the example shown bearings for both the gear shafts 28S and 30S are provided in the cover and opposite wall of the box as is clear from FIGS. 2 and 3. In operation the gear box is releasably supported in position on an end wall of the housing 16 herein (see FIG. 4) by means of lugs 36 on the exterior thereof which pass bolts 38 tapping into suitable threaded openings in the wall of the housing.

When the box is secured in position for use the center of shaft 28S of the gear 28 is aligned with the center of the shaft 26S of the worm 26. The center of shaft 30S for gear 30 is aligned with the center of shaft 18 and the ends of these two shafts are presented in end to end opposition as seen by the dotted lines in FIG. 2. The shaft 28S takes the form of a sleeve which is fitted over the end of shaft 26S. The end of this sleeve may project beyond the cover 34 and there is herein shown a fan 40 mounted thereon and covered by a guard 42. The fan and cover in themselves form no part of the invention but they are not unusual in machines of the kind described and their showing here merely serves to indicate that they may be used consistently with the design of the other parts. The shaft 30S of the gear 30 projects (to the right in FIG. 2) and is coupled to shaft 18 by a separable coupling 44.

It will be apparent from FIG. 2 that if the parts remained in the position shown it would be difficult to get access to gear 30. Therefore the invention contemplates that the holding means for the box 30 may be released (the bolts 38 withdrawn) and when the coupling 44 is released to provide a plane of separation between the adjacent ends of shafts 18 and 26S (the plane being perpendicular to their axes and to the plane of the paper viewing FIGS. 2 and 3) then as indicated in FIG. 3 the entire box and the gears therein may be rotated about the shaft 26S for instance to the dotted line position of FIG. 4 or the position of FIG. 3. If the cover only is to be removed to permit attention to (including changing of) the gears a relatively slight clearance only need be established at the left of the end of shaft 18, corresponding substantially to the thickness of the cover to permit the cover to be backed off and removed laterally since in the position of FIG. 3 the gears themselves are completely disaligned from the shaft 18. However in the example shown the entire box and the gears therein may be removed from the end of shaft 26S toward the right of FIG. 3. As clearly seen in FIG. 4 the left-hand end of the box nearer the center of 28S has been turned to the dotted line position and is at the left of former or full line position of center 30S, the latter corresponding to the fixed axis of shaft 18. The box is therefore free to be withdrawn toward the reader in FIG. 4 without encountering shaft 18. The spacing of the nearer wall of the box from the center of 28S need be only slightly greater than the radius of gear 28 while the distance between the shafts 28S and 30S is equal to the sum of the radii of gears 28 and 30. In other words the former distance is less than the distance between the center lines of shafts 26S and 18 in FIG. 2.

In FIG. 3 the entire coupling 44 is shown backed off along motor shaft 18, but other manipulations may be resorted to to provide the necessary separation of the two shafts and to free the end of shaft 30S from coupling parts.

In FIG. 3 the fan 40 and its guard 42 have been removed from the shaft and will be carried away or set to one side. The cover side of the box is then completely accessible from the right of FIG. 3. The cover may be removed and one or both of the gears pulled or a new pair of gears substituted thereof. If this is to be done at the machine it is convenient to temporarily secure the box in position and one of the lugs 36 viewing FIG. 4 will come in position opposite one of the tapped holes in the housing 16 and a bolt may be inserted to temporarily hold the box in position. On the other hand the entire box may be readily withdrawn from the end of shaft 26S and taken to a bench or other convenient place for working on it. If desired a similar box complete with gears could be substituted for it so that the machine would not be shut down for any substantial length of time.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A machine comprising a first shaft and a second shaft parallel thereto, the second shaft being a power shaft from which power is supplied to the first shaft, the two shafts, being located at opposite sides of a plane between them which is perpendicular to their axes, and having adjacent ends, which ends are spaced laterally and axially offset from one another, supporting means for the first shaft at right angles to its axis and inward from its end, a gear box comprising a tray-like body and a removable cover, the cover and the opposite wall of the body having bearings for the shafts of two intermeshing gears received within the box, one of the gear shafts being a sleeve and the other projecting beyond the cover and means for releasably mounting the bottom of the body from said supporting means with the sleeve over the end of the said first shaft which projects outward beyond said supporting means, and means accessible from the cover side of the box for detachably coupling the projecting end of said other gear shaft end-to-end to the second of said parallel shafts, the lateral spacing of the gear shafts being greater than the distance from the center of the sleeve shaft to the wall of the box at the opposite side of said center whereby, on release of the mounting means and coupling means, the box may be rotated about the shaft end which is in the box sleeve into a position disaligned from the second shaft so that the entire box at its cover side is exposed for access laterally of the second parallel shaft and the box freed for axial withdrawal from the shaft which enters the sleeve.

2. A machine comprising a pair of parallel shafts, the two shafts, being located at opposite sides of a plane between them which is perpendicular to their axes, and having adjacent ends, which ends are spaced laterally and axially offset one from another, a gear supporting frame having bearings for journalling the shafts of two intermeshing gears, one such shaft being a sleeve and the other axially projecting from the frame, and means for removably mounting said frame with the sleeve fitting over the end of one of the parallel shafts and the other gear shaft having its projecting end aligned with the end of the other parallel shaft, means for detachably coupling the last two mentioned ends together, the lateral spacing of the gear centers being greater than the distance of the center of the sleeve from the end of the frame at the opposite side of the said center whereby, on release of the mounting means and coupling means, the frame may be rotated about the shaft end which is in the sleeve so that the frame at its side nearer the coupling means is exposed for access laterally of the said other parallel shaft for withdrawal of said gears therefrom axially in paths lateral to the said other shaft.

3. A machine comprising a shaft through which power is transmitted to operate the machine, a main housing receiving and supporting the shaft, the housing having an end surface through which an end of said shaft projects, means providing a main driving shaft parallel to said first mentioned shaft and having an end laterally spaced and axially offset from the projecting end of said first mentioned shaft, the two ends being located at opposite sides of a perpendicular plane between them, a gear box releasably secured at the exterior of said end surface by means accessible for manipulation to release from the side nearer the main driving shaft, a pair of intermeshing gears within the box one in driving relationship to the projecting end of the first mentioned shaft, the other gear having a shaft with an end projecting from the box for alignment with an end-to-end coupling to said main driving shaft, the lateral spacing of the gear centers being greater than the distance of the center of said one gear from the wall of the box at the opposite side of said center.

4. A machine as set forth in claim 3 wherein the means for securing the box to said end surface comprises bolts tapping into said surface and so arranged about the center of the said one gear that after removal of the bolts and rotation of the box about the first mentioned shaft at least one of the bolts can be engaged in a tapping of said surface to hold the box in a second position with its gears and shafts lateral to the main driving shaft.

5. A machine comprising a shaft through which power is transmitted to operate the machine, a main housing receiving and supporting the shaft, the housing having an end surface through which an end of said shaft projects, means providing a main driving shaft parallel to said first mentioned shaft and having an end laterally spaced and axially offset from the projecting end of said first mentioned shaft, the two ends being located at opposite sides of a perpendicular plane between them, a gear box comprising a tray-like body and a generally flat removable cover, the body being releasably secured to the exterior of the surface by means accessible for manipulation and release from the side nearer the main driving shaft, a pair of intermeshing gears within the box, one in driving relationship to the projecting end of the first mentioned shaft and the other gear having a shaft with one end projecting from the box a distance substantially greater than the thickness of the cover for alignment with an end-to-end coupling to said main driving shaft whereby on separation of such coupling and release of the box the latter may be turned to disalign the shaft of the other gear with the driving shaft and permit removal of the cover from the box, and axial withdrawal of the gears.

References Cited in the file of this patent

UNITED STATES PATENTS

| | | |
|---|---|---|
| 1,874,261 | Evelyn | Aug. 30, 1932 |
| 2,813,435 | Schumb | Nov. 19, 1957 |
| 2,832,229 | Rieser | Apr. 29, 1958 |
| 2,886,978 | Heijnis | May 19, 1959 |
| 2,906,137 | Bade | Sept. 29, 1959 |